(12) United States Patent
Henriksson

(10) Patent No.: US 12,104,624 B2
(45) Date of Patent: Oct. 1, 2024

(54) DEVICE AND A SYSTEM FOR CONTROLLING THE TURNING OF AN OBJECT

(71) Applicant: EMTW Production AB, Halmstad (SE)

(72) Inventor: Arne Henriksson, Bastad (SE)

(73) Assignee: EMTW Production AB, Halmstad (SE)

( * ) Notice: Subject to any disclaimer, the term of this patent is extended or adjusted under 35 U.S.C. 154(b) by 383 days.

(21) Appl. No.: 17/457,413

(22) Filed: Dec. 2, 2021

(65) Prior Publication Data
US 2022/0178425 A1  Jun. 9, 2022

(30) Foreign Application Priority Data

Dec. 4, 2020 (SE) .................................. 2051420-4

(51) Int. Cl.
*F15B 15/16* (2006.01)
*B60G 3/01* (2006.01)
(Continued)

(52) U.S. Cl.
CPC ................ *F15B 15/16* (2013.01); *B60G 3/01* (2013.01); *B62D 5/0418* (2013.01); *B62D 7/023* (2013.01);
(Continued)

(58) Field of Classification Search
CPC ........ F15B 15/16; F15B 15/063; F15B 15/02; F15B 15/2853; F15B 15/2861;
(Continued)

(56) References Cited

U.S. PATENT DOCUMENTS

| | | | | |
|---|---|---|---|---|
| 2,986,122 | A | * | 5/1961 | Shattuck ............... F15B 15/063 92/136 |
| 3,815,479 | A | * | 6/1974 | Thompson ............ F15B 15/063 92/155 |
| 4,005,641 | A | * | 2/1977 | Nussbaumer ....... B29C 45/5008 92/33 |
| 4,541,652 | A | | 9/1985 | Deux et al. |

(Continued)

FOREIGN PATENT DOCUMENTS

| | | |
|---|---|---|
| DE | 3743203 A1 | 7/1989 |
| EP | 2266864 A2 | 12/2010 |

(Continued)

OTHER PUBLICATIONS

Office Action and Search Report, dated Jun. 22, 2021, 6 pages, issued in Swedish Application No. 2051420-4.

*Primary Examiner* — Dustin T Nguyen
(74) *Attorney, Agent, or Firm* — AVEK IP, LLC

(57) ABSTRACT

A device and a system for controlling the turning of an object includes a shaft enclosing a first space, and a sleeve forming a second space between the shaft and the sleeve. Movement of the sleeve is transmitted to movement of the object. The device further comprises a housing comprising means for rotating the shaft and at least one inlet for a lubricant, and a lubricant collector. The shaft has a first through hole extending from the first space to the second space, and the sleeve has at least a second through hole for providing the second space in fluid communication with the lubricant collector. The housing is in fluid communication with the second space, and the first space is pressurizeable for causing the lubricant in the second space to be displaced through the second through hole and collected in the lubricant collector.

20 Claims, 5 Drawing Sheets

(51) Int. Cl.
*B62D 5/04* (2006.01)
*B62D 7/02* (2006.01)
*B62D 7/06* (2006.01)
*F15B 15/06* (2006.01)
*F15B 15/14* (2006.01)
*F16N 7/36* (2006.01)
*F15B 15/02* (2006.01)

(52) U.S. Cl.
CPC .............. *B62D 7/06* (2013.01); *F15B 15/063* (2013.01); *F15B 15/149* (2013.01); *F16N 7/36* (2013.01); *F15B 15/02* (2013.01)

(58) Field of Classification Search
CPC ..... F15B 15/149; B62D 5/0418; B62D 7/023; B62D 7/06; B60G 3/01; B60G 2200/44; B60G 2300/37; F16N 7/36
See application file for complete search history.

(56) References Cited

U.S. PATENT DOCUMENTS

| | | | |
|---|---|---|---|
| 4,651,398 A | | 3/1987 | Souther |
| 5,367,943 A | * | 11/1994 | Stoll .......................... B25J 9/14 91/61 |
| 5,406,877 A | * | 4/1995 | Thiele ...................... B60G 3/00 92/52 |
| 8,936,250 B2 | * | 1/2015 | Henriksson .............. B60G 3/01 280/6.157 |
| 2008/0093818 A1 | | 4/2008 | Nykanen et al. |

FOREIGN PATENT DOCUMENTS

| | | |
|---|---|---|
| JP | H07276966 A | 10/1995 |
| WO | 03106245 A1 | 12/2003 |
| WO | 2012030281 A1 | 3/2012 |

\* cited by examiner

DEVICE AND A SYSTEM FOR CONTROLLING THE TURNING OF AN OBJECT

CROSS-REFERENCE TO RELATED APPLICATIONS

This application claims priority to Swedish Patent Application No. 2051420-4, filed 4 Dec. 2020, the disclosure of which is incorporated by reference herein in its entirety.

FIELD OF THE INVENTION

The invention relates to a device and a system for controlling the turning of an object. It particularly relates to a device and a system for controlling the turning of an object which is mounted on a telescoping cylinder device.

BACKGROUND OF THE INVENTION

WO 2012/030281 discloses a telescoping cylinder device as well as a vehicle comprising a chassis, a plurality of wheels and a plurality of telescoping cylinder devices operatively connected to the wheels. Each telescoping cylinder device comprises a first cylinder and a second cylinder which is axially displaceable relative to the first cylinder in response to a pressure exerted by a pressure medium.

When comprised by the described vehicle, the telescoping cylinder devices allow for adjusting the height of the vehicle as well as lifting one or several of the wheels from the ground. This may, for example, be used to allow the vehicle to climb a hurdle.

In addition to wheel suspension as described above, the telescoping cylinder device may further be used in different industrial applications, for instance in cranes and lifting trucks. In many of the possible applications, it is desirable or necessary to be able to control the turning or rotation of an object, such as a wheel, which is mounted at one end of the telescoping cylinder device. The turning has to be controllable independently of the height/length of the telescoping cylinder device at the time.

There is a need for a device for controlling the turning of an object which is mounted on a telescoping cylinder device, such as a wheel, in an efficient, safe and reliable manner.

SUMMARY OF THE INVENTION

The invention provides a device and a system for controlling the turning of an object which is mounted on a height/length adjustable suspension, such as a telescoping cylinder device. The invention is based on a number of realisations. One of them is that a shaft and a sleeve, which are axially displaceable and rotationally locked in relation to each other, can be used to ensure that control of the object is obtained independently of what height/length the adjustable suspension has at the time. Another one of the realisations is that lubrication between the shaft and the sleeve is important to make the device durable and functional, and this can be achieved by constructing the device so that a lubricant can be pumped between the shaft and the sleeve. A further realisation is that the relative motion between the shaft and the sleeve can advantageously be used for pumping said lubricant.

The term "exemplary" should in this application be understood as serving as an example, instance, or illustration.

According to a first aspect of the invention, a device for controlling the turning of an object is provided. Said device comprises a shaft having a hollow cylindrical shape with a central axis and a circumferential wall enclosing a first space. The device further comprises a sleeve having a hollow cylindrical shape with a circumferential wall, said sleeve being arranged so that at least a portion of its circumferential wall encloses said shaft along at least a portion of the axial extension of said shaft, forming a second space between said shaft and said sleeve. Said sleeve is axially displaceable and rotationally locked in relation to said shaft, and axially and rotationally locked in relation to said object to be turned, whereby movement of the sleeve is transmitted to movement of the object. The device further comprises a housing comprising means for rotating the shaft about the central axis, said shaft being axially locked in relation to said housing, said housing further comprising at least one inlet for a lubricant. The device also comprises a lubricant collector for collecting said lubricant. The circumferential wall of said shaft has at least a first through hole, extending from said first space to said second space, and said circumferential wall of said sleeve has at least a second through hole, for providing the second space in fluid communication with the lubricant collector. The housing is in fluid communication with said second space, so that the lubricant can flow from the housing to said second space, and said first space is pressurizeable, for causing the lubricant in said second space to be displaced through said second through hole, and collected in said lubricant collector.

The object to be turned may for example be a wheel, for instance a wheel mounted on a vehicle. In such an application, a device according to the first aspect of the invention may suitably be mounted in connection with each wheel of the vehicle, to enable control of the steering of the vehicle. However, in embodiments, said object may be any other object which is to be controlled in an axial and/or turning (pivoting) motion. For instance, said object could be a bucket, a claw, etc.

The phrase "turning of an object" means rotation of an object about the central axis of the shaft. It does not mean rotation of the object about the object's central axis, such as the wheel axis, unless this coincides with the central axis of the shaft.

The shaft may suitably be made of metal to ensure durability and strength of the device. The sleeve may suitably also be made of metal. Other materials are also conceivable.

The shaft and the sleeve may suitably have dimensions such that an inner diameter of the sleeve is slightly greater than an outer diameter of the shaft. This is beneficial since it allows for the sleeve to be axially displaced in relation to said shaft. The difference between the inner diameter of the sleeve and the outer diameter of the shaft determines the size of the second space. The second space should be wide enough for the lubricant to pass between the shaft and the sleeve. In an exemplary embodiment, the second space should further be narrow enough to ensure that the sleeve is rotationally locked in relation to said shaft. This may be achieved by having splines on the shaft, and corresponding grooves on the inside of the sleeve, so that the splines rotationally lock the sleeve to the shaft.

The housing may comprise a bottom plate, a top plate and a peripheral wall connecting the bottom plate with the top plate. The bottom plate may comprise an aperture through which the shaft extends. The means for rotating the shaft may be partially or entirely enclosed by said housing.

Said housing comprises at least one inlet for a lubricant, preferably two. The purpose of this is to ensure that the device may work reliably and smoothly, by distributing lubricant over at least some of the essential moving parts of the device. The inlet(s) may suitably be of a nozzle type, through which the lubricant is sprayed into the housing. The lubricant may also be sprayed at least partially over the portions of the means for rotating the shaft which are enclosed in said housing. Other types of inlets for the lubricant are also conceivable, such as an aperture through which the lubricant is pumped into the housing.

The lubricant collector is arranged outside of the circumferential wall of said sleeve, at a distal end of said sleeve. The lubricant collector is there for collecting lubricant which is pumped out from said second space. The lubricant that is collected in the lubricant collector may be led to a tank for filtering and/or reusing. The reason for pumping some of the lubricant out of the second space is to alleviate the risk of having too much lubricant in the second space, which would prevent the device from working properly.

The first through hole extends from said first space to said second space. In other words, the first through hole extends through the circumferential wall of said shaft. In some embodiments, there may be more than one first through hole extending from the first to the second space. According to one exemplary embodiment, there are four holes extending through said circumferential wall of said shaft, from said first space to said second space. The hole(s) may be oriented perpendicularly to the axial extension of said circumferential wall of said shaft. The first through hole, and any other holes extending from said first to said second space, should be dimensioned to allow air to pass through said hole(s).

The second through hole provides the second space in fluid communication with the lubricant collector. The term "fluid communication" means that a fluid may be transported from said second space to said lubricant collector, through said second through hole. In other words, the second through hole may extend through the circumferential wall of said sleeve. In some embodiments, there may be more than one hole providing the second space in fluid communication with the lubricant collector. According to exemplary embodiments, there are four holes providing the second space in fluid communication with the lubricant collector. The hole(s) may be oriented perpendicularly to the axial extension of said circumferential wall of said sleeve. The second through hole, and any other holes providing the second space in fluid communication with the lubricant collector, should be dimensioned to allow lubricant to pass through said hole(s).

The first space, which is enclosed by the circumferential wall of the shaft, is pressurizeable. The term "pressurizeable" means that the pressure in the first space may be increased above the atmospheric pressure outside of the first space. The device may comprise means for pressurizing said first space. This may be achieved by expanding the first space, sealing the space from the outside, and compressing the first space back to its original size. This means for pressurizing the first space may be similar to the way of working for a conventional bicycle pump. Other means of pressurizing the first space are also conceivable, such as using a pump to introduce more air into the first space.

According to exemplary embodiments of the first aspect of the invention, air enters said first space during axial displacement of said sleeve in relation to said shaft, in a direction away from said housing. This may be achieved by arranging a washer at an end portion of the shaft, releasably sealing said first space from the outside of the device, said washer being arranged so that the sealing opens during axial displacement of said sleeve in relation to said shaft, in a direction away from said housing. When said sealing is opened, air may enter said first space. In other words, the first space expands during axial displacement of said sleeve in relation to said shaft, and air is allowed to enter said first space. This means that immediately after axial displacement of said sleeve in relation to said shaft, away from said housing, the amount of air in said space is higher than before the displacement. This leads to the possibility of pressurizing the first space, if the volume of the first space is decreased back to its original volume, by displacement of said sleeve in relation to said shaft, in a direction towards said housing. The washer may suitably be made of a rubber material.

According to exemplary embodiments of the first aspect of the invention, air enters said second space through the first through hole during axial displacement of said sleeve in relation to said shaft, in a direction towards said housing, causing said lubricant to be pumped out through said second through hole. In other words, during axial displacement of said sleeve in relation to said shaft, in a direction towards said housing, the first space may be pressurized, causing some of the air in the first space to exit the first space through the first through hole, and enter said second space. When air from the first space enters said second space, the pressure in the second space may increase, which may cause said lubricant to be pumped out through said second through hole. After being pumped out through said second through hole, the lubricant may be collected in said lubricant collector.

According to exemplary embodiments of the first aspect of the invention, the device further comprises means for recirculating the lubricant that is collected in said lubricant collector, so that it is returned to said housing through said at least one inlet. This may be achieved by conveying the lubricant to a tank, where it may be filtered and then reused. Alternatively, or additionally, the lubricant may be conveyed directly back to the housing through the at least one inlet for the lubricant.

According to exemplary embodiments of the first aspect of the invention, said shaft has at least one projection extending radially outwards from the circumferential wall of said shaft. Said sleeve has at least one groove extending radially inwards from the inside of the circumferential wall of said sleeve, said shaft and sleeve being arranged so that said projection is arranged at least partially in said groove. The dimensions of the shaft and its at least one projection, and the sleeve and its at least one groove, may be such that when the projection is placed in the groove, it prevents the sleeve from rotating about the shaft. The dimensions may also be such that the second space between the shaft and the sleeve is very small. The purpose of having a second space is to enable lubrication of the device, which is beneficial since it makes the device more durable and easier to operate.

According to exemplary embodiments, said shaft is a splines shaft, having at least one spline extending radially outwards from said shaft, and said sleeve is a splines sleeve having at least one groove. The splines sleeve suitably has the same number of grooves as the number of splines on the splines shaft. In exemplary embodiments, the shaft has at least 3 splines, for instance 18 splines.

According to exemplary embodiments of the first aspect of the invention, said means for rotating the shaft about the central axis includes a worm wheel in engagement with at least one worm screw; so that rotating the at least one worm screw causes said worm wheel to rotate, which causes said shaft to rotate about its central axis. The means for rotating the shaft about the central axis may preferably include two worm screws, placed on opposite sides of the worm wheel. This is advantageous since it allows for having a smaller housing, which comprises the means for rotating the shaft, compared to if only one worm screw is used. If there are two worm screws, the housing suitably comprises two inlets for a lubricant, arranged so that each inlet can distribute lubricant over one of said worm screws.

According to exemplary embodiments of the first aspect of the invention, said means for rotating the shaft about the central axis further includes at least one actuator. According to further exemplary embodiments, said means for rotating the shaft about the central axis includes two actuators. Preferably, but not necessarily, if the means for rotating the shaft comprises worm screws, it comprises the same number of actuators as worm screws. The actuator(s) may for example be hydraulic actuator(s). According to exemplary embodiments, the actuator may cause the worm screw to rotate, which may cause the worm wheel to rotate, so that the shaft may rotate about its central axis. This movement may be transferred to said sleeve, which is rotationally locked to said shaft, and further on transferred from said sleeve to said object to be turned, which is rotationally locked to said sleeve.

According to exemplary embodiments of the first aspect of the invention, said means for rotating the shaft about the central axis includes a friction controlled hub, arranged to release said shaft from said worm wheel if the friction between the shaft and the worm wheel reaches above a predetermined threshold. This is advantageous since it prevents the device from being damaged if the object to be turned for example gets stuck. If the object is stuck, and the means for rotating the shaft about its central axis keeps trying to rotate the shaft, the means for rotating may be damaged, as well as the rest of the device and the object. Therefore, a friction controlled hub may be used to release the shaft and avoid damage in such situations.

According to a second aspect of the invention, a system comprising a device according to the first aspect of the invention is provided. Said system further comprises a telescoping cylinder device having a first cylinder having a cylindrical inner wall, a cylindrical outer wall and a space between said inner and outer walls. The telescoping cylinder device further comprises a second cylinder having a cylindrical wall which is axially displaceable in said space in response to a pressure exerted by a pressure medium: and a central through hole extending axially through said first and second cylinders. Said shaft is arranged at least partially inside said first cylindrical inner wall, and said shaft is axially locked to said first cylinder. Said sleeve is axially locked to said second cylinder, so that axial displacement of said second cylinder in relation to said first cylinder causes axial displacement of said sleeve in relation to said shaft.

Said sleeve may be rotationally locked in relation to said second cylinder. This allows for the object to be turned to be mounted on the second cylinder. In embodiments, the object to be turned may be a wheel. This wheel may be mounted so that it is axially and rotationally locked in relation to said second cylinder. Further, a motor may be mounted on said second cylinder, in connection with said wheel, to allow for controlling the rotation of the wheel.

According to exemplary embodiments of the second aspect of the invention, said pressure medium and said lubricant are of the same fluid. This is advantageous since redundant pressure medium can be collected together with the lubricant in the lubricant collector, and they can be reused together. According to further exemplary embodiments, the pressure medium and the lubricant are of different fluids. This may be advantageous if specific features are desired for the two fluids.

According to a third aspect of the invention, there is provided a vehicle comprising a device according to the first aspect or a system according to the second aspect.

These and other features and advantages of the invention will in the following be further clarified with reference to embodiments described hereinafter.

BRIEF DESCRIPTION OF THE DRAWINGS

These and other aspects of the invention will now be described in more detail, with reference to the appended drawings illustrating the invention.

DETAILED DESCRIPTION

In the following detailed description, embodiments of the invention are described. However, it is to be understood that features of the different embodiments are exchangeable between the embodiments and may be combined in different ways, unless anything else is specifically indicated. Even though in the following description, numerous specific details are set forth to provide a more thorough understanding of the invention, it will be apparent to one skilled in the art that the invention may be practiced without these specific details. In other instances, well known constructions or functions are not described in detail, so as not to obscure the invention.

Figure 1:
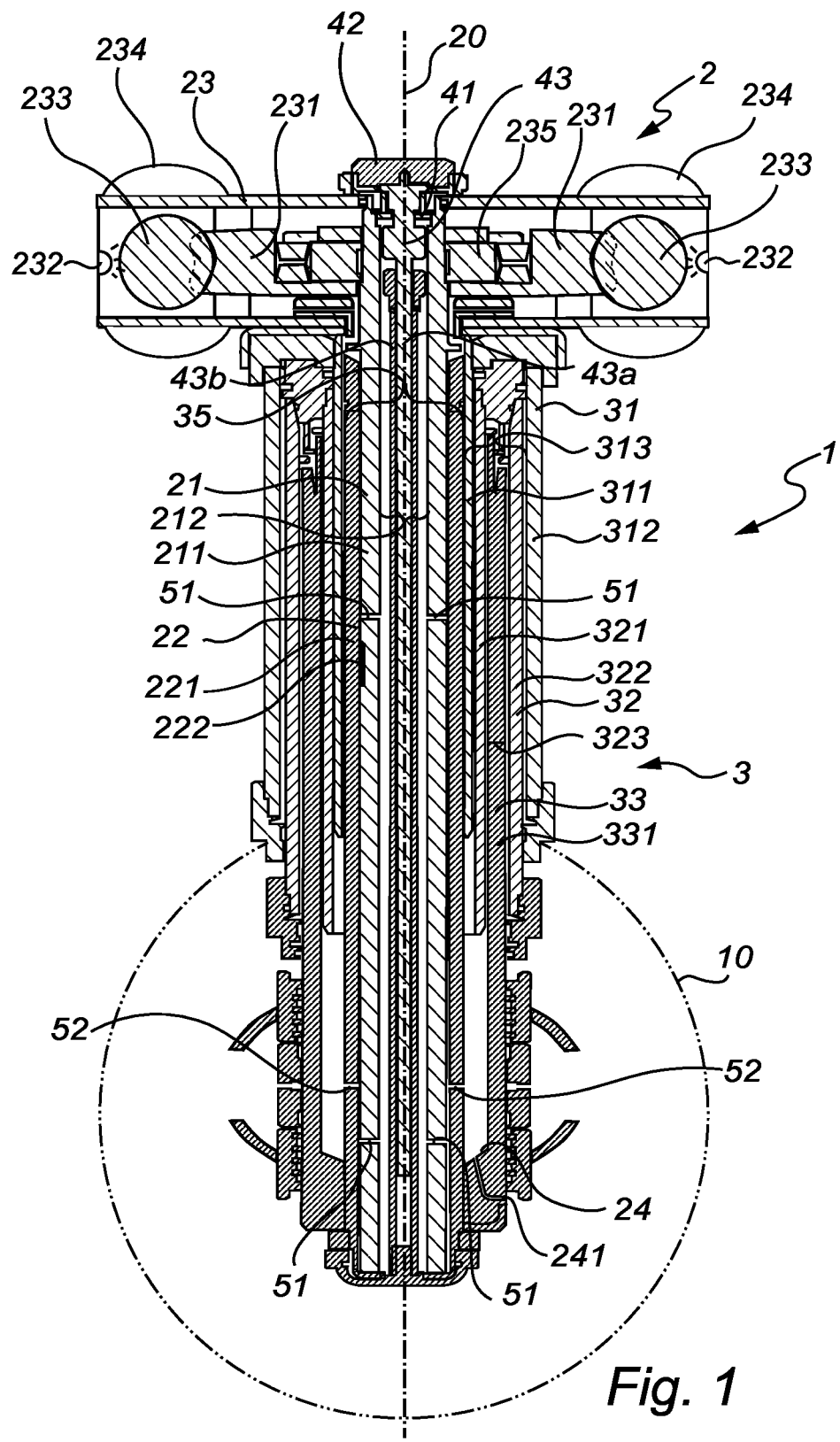
FIG. 1 shows a sectional view of exemplary embodiments of a system according to the second aspect of the invention, comprising a device according to the first aspect of the invention.

FIG. 1 illustrates a sectional view of an exemplary embodiment of a system 1 according to the second aspect of the invention, comprising a device 2 according to the first aspect of the invention. The system further comprises a telescoping cylinder device 3 having a first cylinder 31 having a cylindrical inner wall 311, a cylindrical outer wall 312 and a first cylinder space 313 between the inner and outer walls. The telescoping cylinder device 3 further has a second cylinder 32 having a cylindrical inner wall 321, a cylindrical outer wall 322 and a second cylinder space 323 between the inner and outer walls. The second cylinder 32 is axially displaceable in the first cylinder space 313 in response to a pressure exerted by a pressure medium. The telescoping cylinder device 3 further comprises a third cylinder 33 having a wall 331 which is axially displaceable in the second cylinder space 323 in response to a pressure exerted by the pressure medium. The telescoping cylinder device 3 also comprises a central through hole 35 extending axially through the first, second and third cylinders 31, 32, 33.

The illustrated exemplary embodiment of a device 2 according to the invention comprises a shaft 21 having a hollow cylindrical shape with a central axis 20 and a circumferential wall 211 enclosing a first space 212. The device further comprises a sleeve 22 having a hollow cylindrical shape with a circumferential wall 221, the sleeve being arranged so that at least a portion of its circumferential wall 221 encloses the shaft 21 along at least a portion of the axial extension of the shaft, forming a second space 222 between the shaft 21 and the sleeve 22. The sleeve 22 is axially displaceable and rotationally locked in relation to the shaft 21, and axially and rotationally locked in relation to the object to be turned 10, whereby movement of the sleeve 22 is transmitted to movement of the object 10. The device 2 further comprises a housing 23 comprising means for rotating the shaft about the central axis 20, the shaft 21 being axially locked in relation to the housing 23. The housing 23 further comprises at least one inlet for a lubricant 232, and the device 2 further comprises a lubricant collector 24 for collecting the lubricant. In the illustrated embodiment, the housing 23 comprises two inlets for a lubricant 232.

The shaft 21 is arranged at least partially inside the cylindrical inner wall 311 of the first cylinder 31, and the shaft 21 is axially locked to the first cylinder 31. The sleeve 22 is axially locked to the third cylinder 33, so that axial displacement of the third cylinder 33 in relation to the first cylinder 31 causes axial displacement of the sleeve 22 in relation to the shaft 21.

The circumferential wall of the shaft 211 has at least a first through hole 51, extending from the first space 212 to the second space 222. The circumferential wall of the sleeve 221 has at least a second through hole 52, for providing the second space 222 in fluid communication with the lubricant collector 24. In the illustrated embodiment, there are at least four through holes 51 extending from the first space 212 to the second space 222, and at least two through holes 52 for providing the second space 222 in fluid communication with the lubricant collector 24.

The housing 23 is in fluid communication with the second space 222, so that the lubricant can flow from the housing 23 to the second space 222. The first space 212 is pressurizeable, for causing the lubricant in the second space 222 to be displaced through the second through hole 52, and collected in said lubricant collector 24. This will be described further in relation to FIG. 2-FIG. 4. From the lubricant collector 24, the lubricant may be led out through at least one opening 241, allowing the lubricant to be recirculated. The opening 241 may lead the lubricant to a tank where it may be filtered and/or reused.

Figure 5:
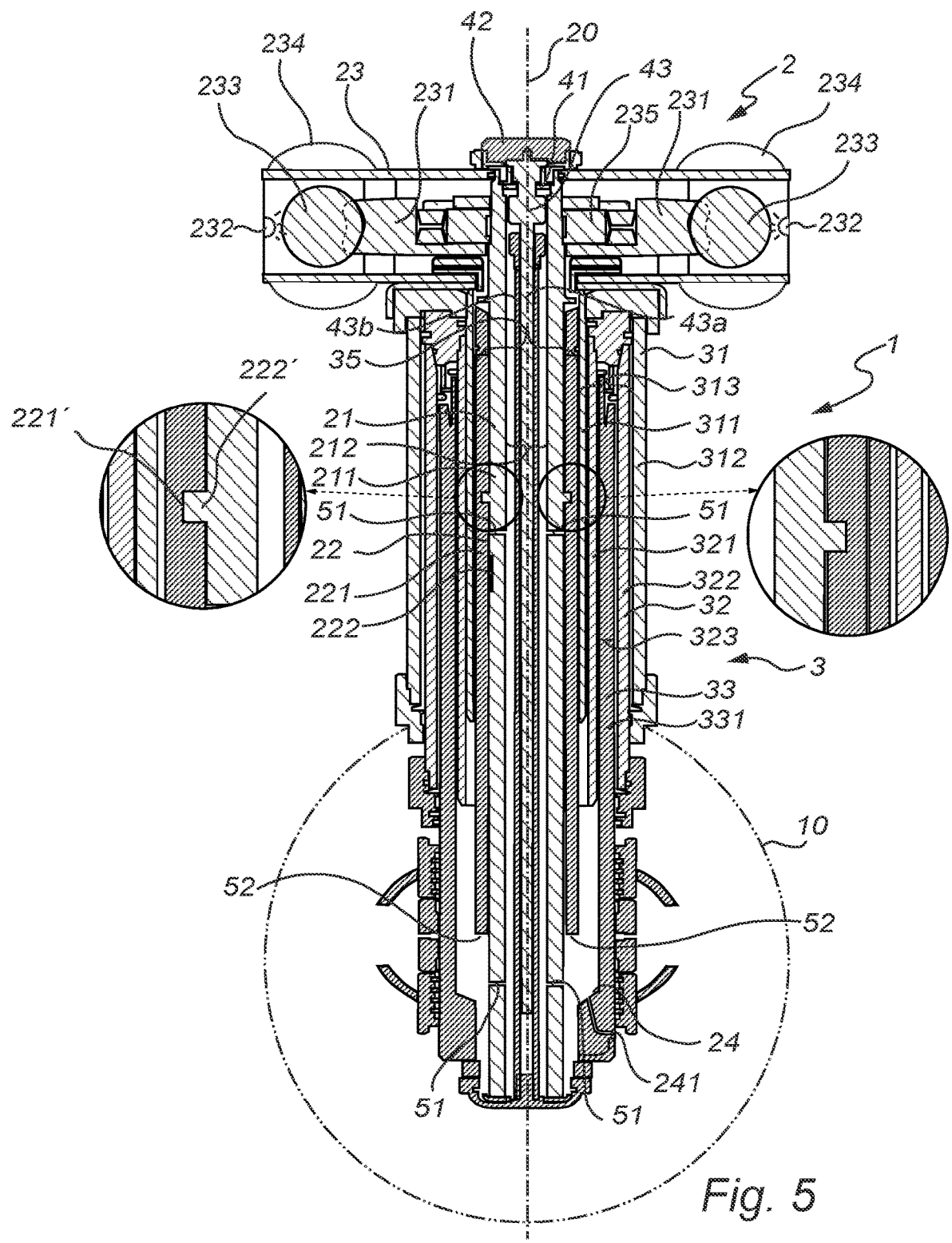
FIG. 5 shows a schematic sectional view of the system illustrated in FIG. 1.

To achieve rotational locking between the shaft 21 and the sleeve 22, the shaft 21 may have at least one projection 222 extending radially outwards from the circumferential wall of the shaft 211, and the sleeve 22 may have at least one groove 221 extending radially inwards from the inside of the circumferential wall 221 of the sleeve, as depicted in FIG. 5. The shaft 21 and the sleeve 22 may be arranged so that the projection 222 is arranged at least partially in the groove 221. Although not shown in the figure, in the illustrated embodiment, the shaft 21 may be a splines shaft, and the sleeve 22 may be a splines sleeve.

In the illustrated exemplary embodiment, the means for rotating the shaft 21 about the central axis 20 includes a worm wheel 231 in engagement with at least one worm screw 233. In this embodiment, there are two worm screws 233. Rotating the worm screws 233 causes the worm wheel 231 to rotate, which causes the shaft 21 to rotate about its central axis 20. Since the sleeve 22 is rotationally locked to the shaft 21, and the object to be turned 10 is rotationally locked to the sleeve 22, the rotation of the shaft 21 may be transferred to turning of the object 10.

The means for rotating the shaft 21 about the central axis 20 may also include at least one actuator 234. In the illustrated exemplary embodiment, the device comprises two actuators 234, each of the actuators being connected to one of the worm screws 233 respectively, to allow the actuators to rotate the worm screws. The actuators 234 may for example be hydraulic or electric actuators. Further, the means for rotating the shaft 21 about the central axis 20 may include a friction controlled hub 235, arranged to release the shaft 21 from the worm wheel 231 if the friction between the shaft 21 and the worm wheel 231 reaches above a predetermined threshold. The purpose of this is to prevent the device from being damaged, if the object to be turned 10 gets stuck.

The illustrated embodiment further comprises a washer 41 arranged to releasably seal the first space 212 from the outside of the device. The function of the washer 41 will be further described in relation to FIG. 2-FIG. 4.

The exemplary embodiment illustrated in FIG. 1 further comprises a position gauge 43. The position gauge 43 may be arranged in the first space 212, and may comprise a first part 43a and a second part 43b. The first part 43a and the second 43b part may be axially displaceable in relation to each other. For instance, the first part 43a of the position gauge 43 may be axially locked to the housing 23, and the second part 43b may be axially locked to the third cylinder 33. When the position of the system changes, e.g. when the third cylinder 33 is axially displaced in relation to the housing 23, a sensor (not shown) may measure the relative positions of the first part 43a and the second part 43b of the position gauge 43, and the length of the device at the time can thus be determined. The parameter that is measured to determine this may for example be changes in voltage or a magnetic field.

The device may also comprise an electronic rotation gauge 42. The rotation gauge comprises at least two sensors, and is arranged on the shaft 21. Both of the two sensors are arranged to measure the rotation of the shaft 21, and by extension also the rotation of the object to be turned 10. If the two sensors get different results it is an indication that the object to be turned is stuck. In an application where the object to be turned is a wheel mounted on a vehicle, this may for example correspond to the vehicle driving into something. If this happens, the electronic rotation gauge 42 may send a signal to shut down the actuators 234, to prevent the device from getting damaged. The rotation gauge 42 may also have the possibility to remember the rotational position of the object 10 before it got stuck (e.g. by means of a connected computer or the like), and it may therefore be possible to automatically return the object 10 to this position once it has been released.

FIG. 1 shows the system in a compressed position. The term "compressed position" means that the second cylinder 32 is axially displaced as far as possible into the first cylinder space 313, and the third cylinder 33 is axially displaced as far as possible into the second cylinder space 323.

Figure 2:
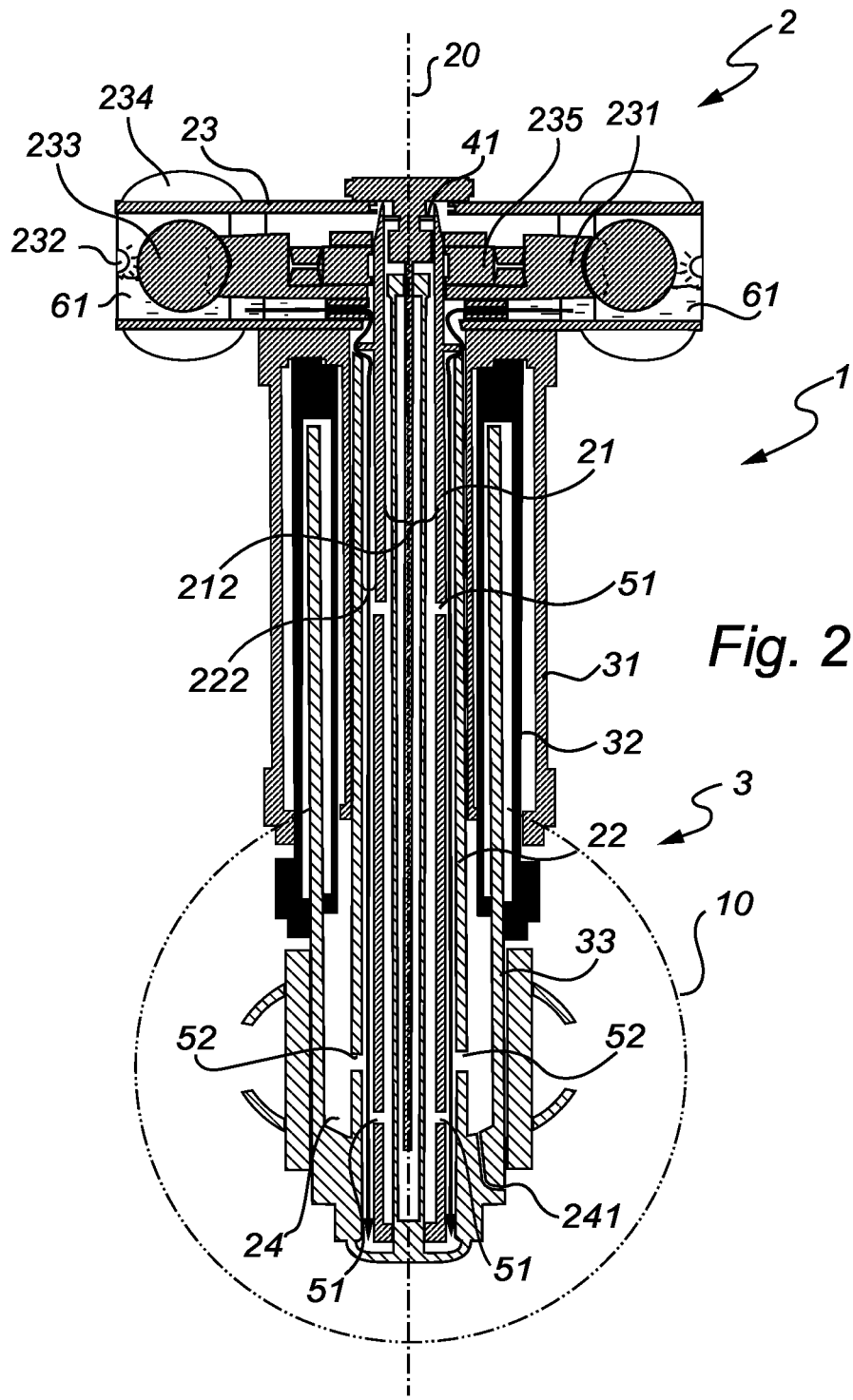
FIG. 2 shows a schematic sectional view of the system illustrated in FIG. 1, in a compressed position.

FIG. 2 shows a schematic sectional view of the system illustrated in FIG. 1, also in a compressed position. In this figure it is shown where in the device the lubricant may be present. As previously described, lubricant is entered into the housing 23 through two inlets 232. Preferably, the lubricant is sprayed over the two worm screws 233. In the housing, a lubricant bath 61 is built up. This lubricant bath 61 enables continuous lubrication of the worm screws 233 and the worm wheel 231.

As previously described, the housing 23 is in fluid communication with the second space 222, so that the lubricant can flow from the lubricant bath 61 in the housing 23 to the second space 222. In embodiments where the shaft 21 is a splines shaft, and the sleeve 22 is a splines sleeve, the lubricant may flow between the splines of the splines shaft and the grooves of the splines sleeve. Here the lubricant serves the purpose of allowing smooth axial displacement between the sleeve 22 and the shaft 21.

Figure 3:
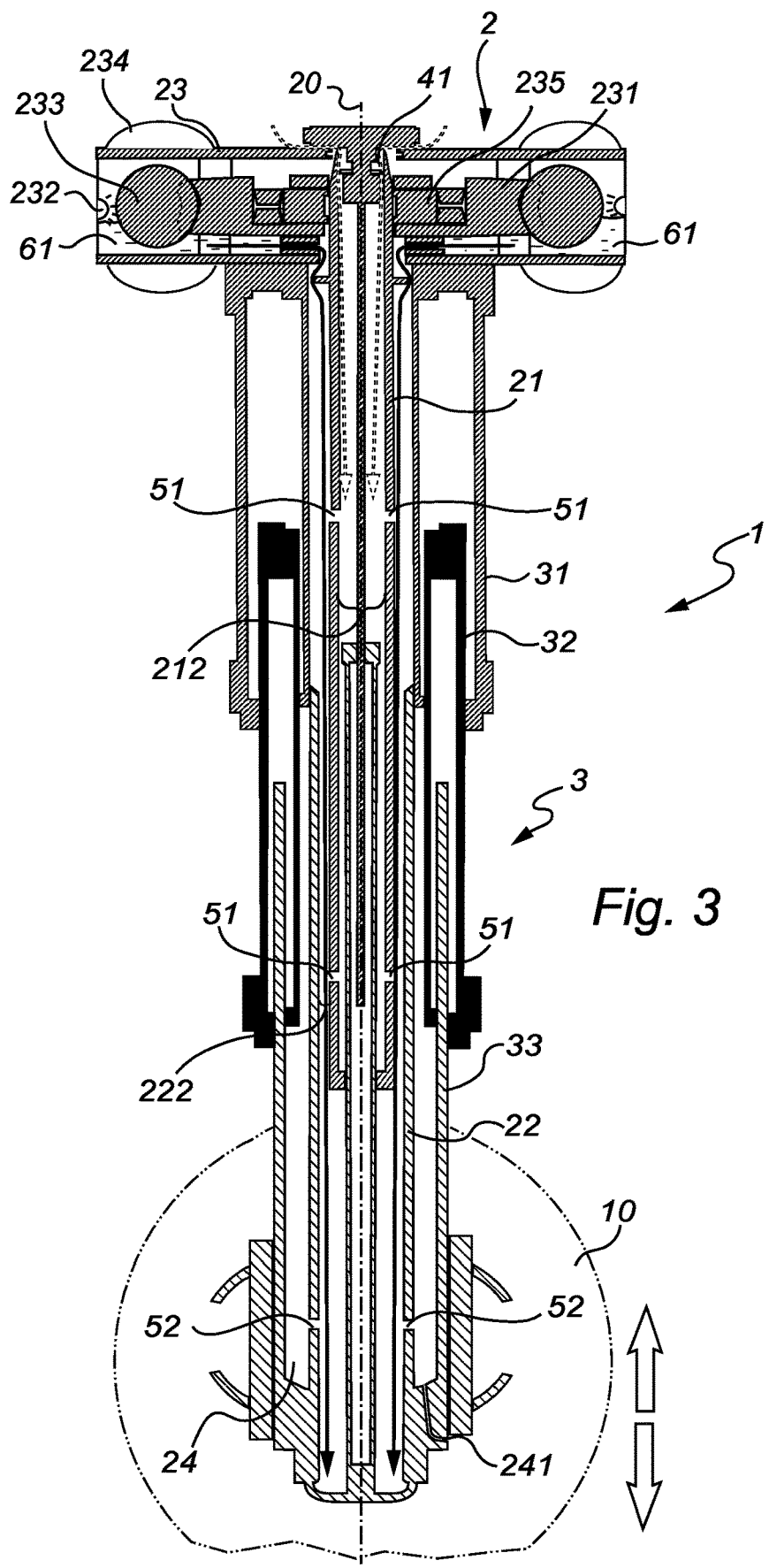
FIG. 3 shows a schematic sectional view of the system illustrated in FIG. 1, during expansion of the system.

FIG. 3 shows a schematic sectional view of the system illustrated in FIG. 1, during expansion of the system. By expansion of the system is meant that the sleeve 22 is being axially displaced in relation to the shaft 21, in a direction away from the housing 23. This may either be achieved by axially displacing the third cylinder 33 away from the housing 23, or axially displacing both the second cylinder 32 and the third cylinder 33 away from the housing 23. During this axial displacement of the sleeve 22 in relation to the shaft 21, air may enter the first space 212. In the illustrated exemplary embodiment, this is possible due to the washer 41. As the sleeve is being displaced, the washer 41 is also slightly displaced, so that it does not seal the first space 212. As the first space 212 expands during displacement, air enters the first space 212.

During axial displacement of the sleeve 22 in relation to the shaft 21, in a direction away from the housing 23, the second space 222 also expands. This allows for more lubricant to flow down from the lubricant bath 61 into the second space 222. When the second space 222 is consecutively compressed, lubricant has to be pumped out, to prevent inertia and damage to the device due to an excess amount of lubricant being present in the second space 222. This is further described in relation to FIG. 4.

Figure 4:
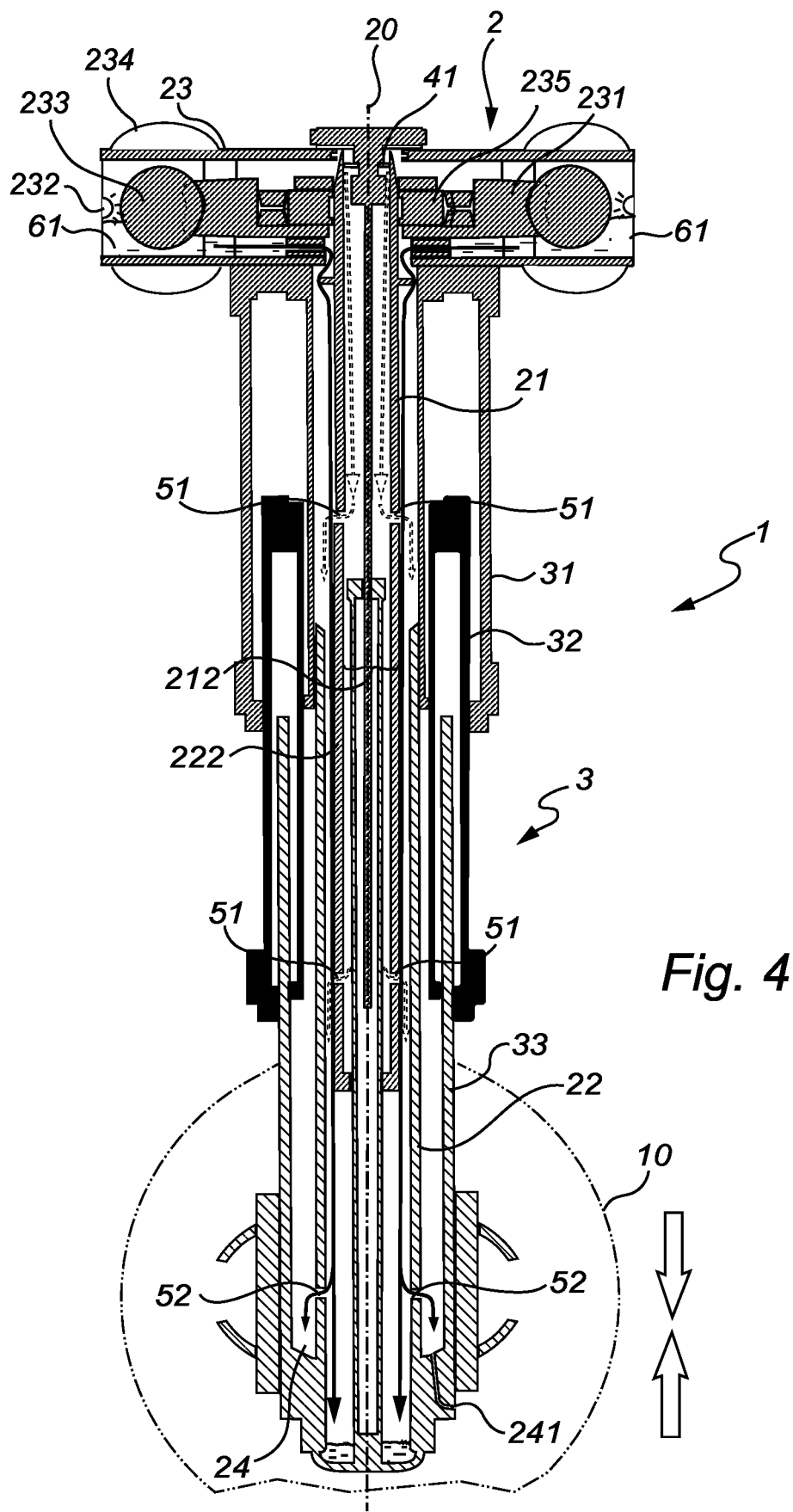
FIG. 4 shows a schematic sectional view of the system illustrated in FIG. 1, during compression of the system.

In both FIG. 3 and FIG. 4, dashed lines/arrows are used to illustrate air flow, and full lines/arrows are used to illustrate lubricant flow.

FIG. 4 shows a schematic sectional view of the system illustrated in FIG. 1, during compression of the system. The term "compression of the system" means that the sleeve 22 is being axially displaced in relation to the shaft 21, in a direction towards the housing 23. This may either be achieved by axially displacing the third cylinder 33 towards the housing 23, or axially displacing both the second cylinder 32 and the third cylinder 33 towards the housing 23. During axial displacement of the sleeve 22 in relation to the shaft 21, in a direction towards the housing 23, air may enter the second space 222 through the first through hole 51, causing the lubricant to be pumped out through the second through hole 52. In the illustrated exemplary embodiment, this is possible due to the washer 41. As the sleeve 21 is being displaced towards to housing 23, the washer 41 seals the first space 212 from the outside of the device 2. As the first space 212 is sealed and at the same time is being compressed, the first space 212 is pressurized. As the pressure in the first space 212 increases, air is forced out into the second space 222, through the first through hole 51. This causes an increased pressure in the second space 222, which results in lubricant being forced out through the second through hole 52, and collected in the lubricant collector 24. This flow of the lubricant allows for full lubrication of the second space, i.e. between the shaft 21 and the sleeve 22, no matter the position of the device.

In exemplary embodiments, the device may further comprise means for recirculating the lubricant that is collected in the lubricant collector 24, so that it is returned to the housing 23 through the at least one inlet 232. This may be achieved through at least one opening 241, which may for example be in fluid communication with a tank and/or a pump. This is however not shown in the illustrated example. The pressure medium which is used for displacing the second cylinder 32 in relation to the first cylinder 31, and the third cylinder 33 in relation to the second cylinder 32, may in some embodiments be of the same fluid as the lubricant. In that case, pressure medium which leaks out from between the cylinders may also be collected in the lubricant collector 24, and recirculated together with the lubricant.

The person skilled in the art realizes that the invention by no means is limited to the embodiments described above. On the contrary, many modifications and variations are possible within the scope of the appended claims. For example, the system may comprise only two cylinders, or more than three cylinders. The number of through holes in the sleeve and shaft may be varied, and it is also conceivable that the shaft and sleeve have a different shape than cylindrical.

In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

What is claimed is:

1. A device for controlling the turning of an object, said device comprising:
   a shaft having a hollow cylindrical shape with a central axis and a circumferential wall enclosing a first space;
   a sleeve having a hollow cylindrical shape with a circumferential wall, said sleeve being arranged so that at least a portion of its circumferential wall encloses said shaft along at least a portion of the axial extension of said shaft forming a second space between said shaft and said sleeve, said sleeve being axially displaceable and rotationally locked in relation to said shaft and axially and rotationally locked in relation to said object to be turned, whereby movement of the sleeve is transmitted to movement of the object;
   a housing comprising means for rotating the shaft about the central axis, said shaft being axially locked in relation to said housing, said housing further comprising at least one inlet for a lubricant; and
   a lubricant collector for collecting said lubricant;
   wherein:
   said circumferential wall of said shaft has at least a first through hole extending from said first space to said second space, and said circumferential wall of said sleeve has at least a second through hole for providing the second space in fluid communication with the lubricant collector; and
   said housing is in fluid communication with said second space so that the lubricant can flow from the housing to said second space, and wherein said first space is pressurizeable for causing the lubricant in said second space to be displaced through said second through hole and collected in said lubricant collector.

2. The device according to claim 1, wherein air enters said first space during axial displacement of said sleeve in relation to said shaft in a direction away from said housing.

3. The device according to claim 2, wherein air enters said second space through the first through hole during axial displacement of said sleeve in relation to said shaft in a direction towards said housing causing said lubricant to be pumped out through said second through hole.

4. The device according to claim 3, further comprising means for recirculating the lubricant that is collected in said lubricant collector so that it is returned to said housing through said at least one inlet.

5. The device according to claim 4, wherein said shaft has at least one projection extending radially outwards from the circumferential wall of said shaft, and wherein said sleeve has at least one groove extending radially inwards from the inside of the circumferential wall of said sleeve, said shaft and sleeve being arranged so that said projection is arranged at least partially in said at least one groove.

6. The device according to claim 5, wherein said means for rotating the shaft about the central axis includes a worm wheel in engagement with at least one worm screw so that rotating the at least one worm screw causes said worm wheel to rotate, which causes said shaft to rotate about its central axis.

7. The device according to claim 6, wherein said means for rotating the shaft about the central axis includes at least one actuator.

8. A system comprising the device according to claim 6, said system further comprising:
   a telescoping cylinder device, comprising:
      a first cylinder having a cylindrical inner wall;
      a cylindrical outer wall; and
      a space between said inner and outer walls;
   a second cylinder comprising a cylindrical wall which is axially displaceable in said space in response to a pressure exerted by a pressure medium; and
   a central through hole extending axially through said first and second cylinders;
   wherein:
      said shaft is arranged at least partially inside said first cylindrical inner wall;
      said shaft is axially locked to said first cylinder; and
      said sleeve is axially locked to said second cylinder so that axial displacement of said second cylinder in relation to said first cylinder causes axial displacement of said sleeve in relation to said shaft.

9. The system according to claim 8, wherein said pressure medium and said lubricant are of the same fluid.

10. The device according to claim 3, further comprising means for recirculating the lubricant that is collected in said lubricant collector so that it is returned to said housing through said at least one inlet.

11. The device according to claim 2, further comprising means for recirculating the lubricant that is collected in said lubricant collector so that it is returned to said housing through said at least one inlet.

12. The device according to claim 1, wherein air enters said second space through the first through hole during axial displacement of said sleeve in relation to said shaft in a direction towards said housing causing said lubricant to be pumped out through said second through hole.

13. The device according to claim 1, further comprising means for recirculating the lubricant that is collected in said lubricant collector so that it is returned to said housing through said at least one inlet.

14. The device according to claim 1, wherein said shaft has at least one projection extending radially outwards from the circumferential wall of said shaft, and wherein said sleeve has at least one groove extending radially inwards from the inside of the circumferential wall of said sleeve, said shaft and sleeve being arranged so that said projection is arranged at least partially in said at least one groove.

15. The device according to claim 1, wherein said means for rotating the shaft about the central axis includes a worm wheel in engagement with at least one worm screw so that rotating the at least one worm screw causes said worm wheel to rotate, which causes said shaft to rotate about its central axis.

16. The device according to claim 15, wherein said means for rotating the shaft about the central axis includes a friction controlled hub arranged to release said shaft from said worm wheel if the friction between the shaft and the worm wheel reaches above a predetermined threshold.

17. The device according to claim 15, wherein said means for rotating the shaft about the central axis includes at least one actuator.

18. The device according to claim 1, wherein said means for rotating the shaft about the central axis includes at least one actuator.

19. A system comprising the device according to claim 1, said system further comprising:
   a telescoping cylinder device, comprising:
      a first cylinder having a cylindrical inner wall;
      a cylindrical outer wall; and
      a space between said inner and outer walls;
   a second cylinder comprising a cylindrical wall which is axially displaceable in said space in response to a pressure exerted by a pressure medium; and
   a central through hole extending axially through said first and second cylinders;
   wherein:
      said shaft is arranged at least partially inside said first cylindrical inner wall;
      said shaft is axially locked to said first cylinder; and
      said sleeve is axially locked to said second cylinder so that axial displacement of said second cylinder in relation to said first cylinder causes axial displacement of said sleeve in relation to said shaft.

20. The system according to claim 19, wherein said pressure medium and said lubricant are of the same fluid.

* * * * *